(12) United States Patent
Cordeiro

(10) Patent No.: US 10,284,275 B2
(45) Date of Patent: May 7, 2019

(54) SINGLE USER AND MULTIUSER MULTIPLE-INPUT AND MULTIPLE-OUTPUT BEAMFORMING

(71) Applicant: Carlos Cordeiro, Portland, OR (US)

(72) Inventor: Carlos Cordeiro, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 118 days.

(21) Appl. No.: 15/388,511

(22) Filed: Dec. 22, 2016

(65) Prior Publication Data

US 2018/0013474 A1 Jan. 11, 2018

Related U.S. Application Data

(60) Provisional application No. 62/359,882, filed on Jul. 8, 2016.

(51) Int. Cl.
*H04B 7/06* (2006.01)
*H04B 7/0413* (2017.01)
*H04B 7/0452* (2017.01)

(52) U.S. Cl.
CPC .......... *H04B 7/063* (2013.01); *H04B 7/0413* (2013.01); *H04B 7/0452* (2013.01); *H04B 7/0617* (2013.01); *H04B 7/0695* (2013.01)

(58) Field of Classification Search
USPC ....................................................... 375/267
See application file for complete search history.

(56) References Cited

U.S. PATENT DOCUMENTS

| 2013/0329712 | A1* | 12/2013 | Cordeiro | H04B 7/0617 370/338 |
| 2015/0244432 | A1 | 8/2015 | Wang | |
| 2015/0289147 | A1 | 10/2015 | Lou et al. | |
| 2016/0190686 | A1 | 6/2016 | Gao et al. | |
| 2017/0222710 | A1* | 8/2017 | Eitan | H04B 7/0689 |
| 2017/0302349 | A1* | 10/2017 | Sun | H04W 76/10 |

FOREIGN PATENT DOCUMENTS

KR 101317570 10/2013

OTHER PUBLICATIONS

International Search Report and Written Opinion for PCT Application No. PCT/US2017/039746, dated Oct. 30, 2017, 11 pages.
Assaf Kasher (Intel), 'Beamforming Training proposals', IEEE 802.11-16/0103r0, Jan. 18, 2016.

* cited by examiner

*Primary Examiner* — Wednel Cadeau
(74) *Attorney, Agent, or Firm* — Eversheds Sutherland (US) LLP

(57) ABSTRACT

This disclosure describes systems, methods, and devices related to multiple-input and multiple-output (MIMO) beamforming. A device may determine one or more short sector sweep frames associated with one or more antennas of the device. The device may cause to set one or more fields of at least one of the one or more short sector sweep frames to indicate an MIMO communication with one or more first devices. The device may identify one or more response frames from at least one of the one or more first devices based at least in part on the one or more short sector sweep frames.

15 Claims, 8 Drawing Sheets

SINGLE USER AND MULTIUSER MULTIPLE-INPUT AND MULTIPLE-OUTPUT BEAMFORMING

CROSS-REFERENCE TO RELATED APPLICATIONS

This application claims the benefit of U.S. Provisional Application No. 62/359,882 filed Jul. 8, 2016, the disclosure of which is incorporated herein by reference as if set forth in full.

TECHNICAL FIELD

This disclosure generally relates to systems, methods, and devices for wireless communications and, more particularly, to single user (SU) and multiuser (MU) multiple-input and multiple-output (MIMO) beamforming.

BACKGROUND

Wireless devices are becoming widely prevalent and are increasingly requesting access to wireless channels. A wireless communication network in a millimeter-wave band may provide high-speed data access for users of wireless communication devices.

DETAILED DESCRIPTION

Figure 1:
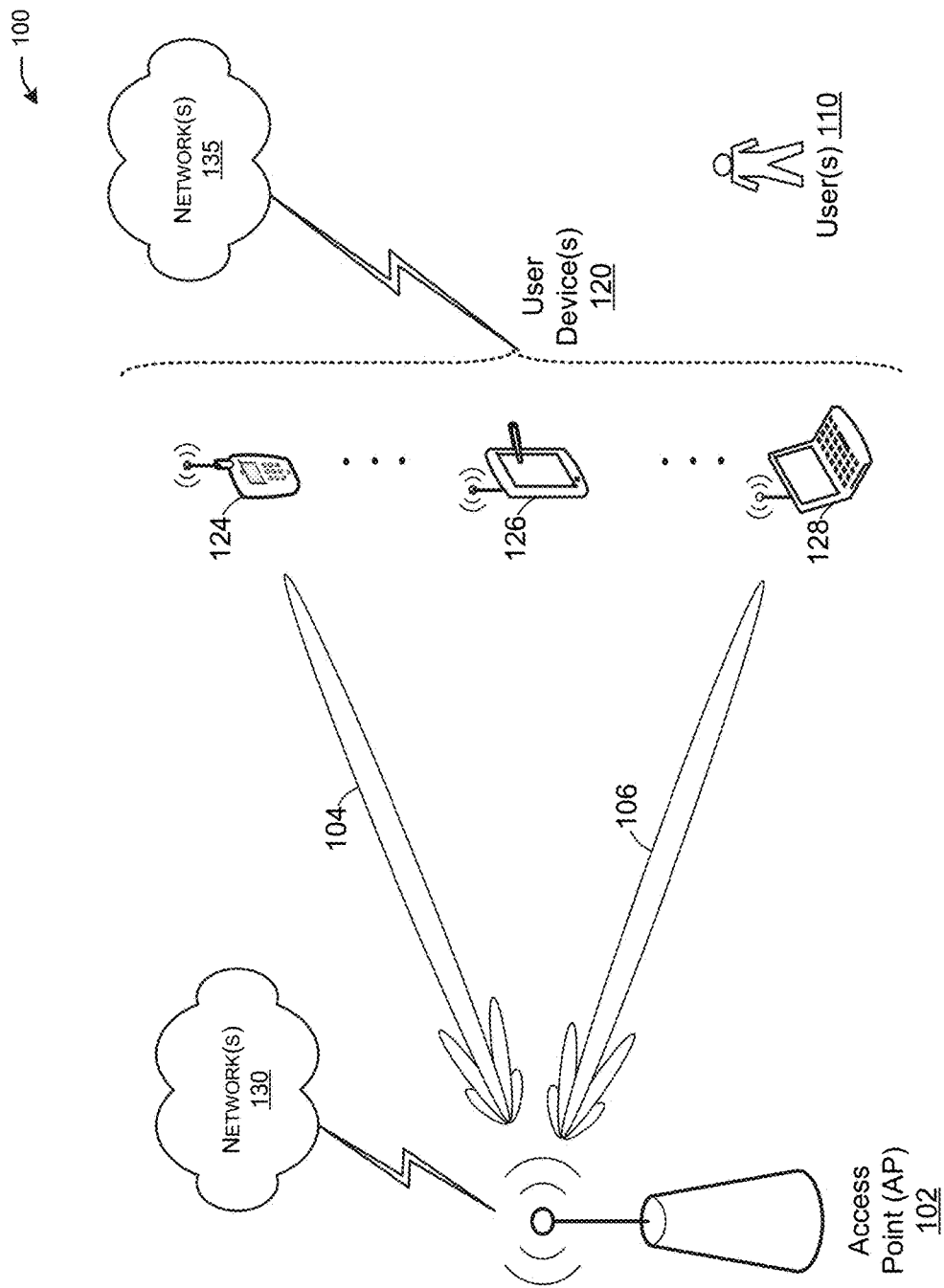
FIG. 1 depicts a network diagram illustrating an example network environment of an illustrative multiple-input and multiple-output (MIMO) beamforming system, according to one or more example embodiments of the disclosure.

Example embodiments described herein provide certain systems, methods, and devices for single user (SU) and multiuser (MU) multiple-input and multiple-output (MIMO) beamforming protocol for Wi-Fi devices in various Wi-Fi networks including, but not limited to, IEEE 802.11ay.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

During communication between two devices, one or more frames may be sent and received. These frames may include one or more fields (or symbols) that may be based on IEEE 802.11 specifications including, but not limited to, an IEEE 802.11ad specification or an IEEE 802.11ay specification. Devices may operate in multiuser multiple-input and multiple-output (MU-MIMO) technology. It is understood that MIMO facilitates multiplying the capacity of a radio link using multiple transmit and receive antennas to exploit multipath propagation. MIMO provides a practical technique for sending and receiving more than one data signal on the same radio channel at the same time via multipath propagation. MU-MIMO provides a means for wireless devices to communicate with each other using multiple antennas such that the wireless devices may transmit at the same time and frequency and still be separated by their spatial signatures. For example, using MU-MIMO technology an access point (AP) may be able to communicate with multiple devices using multiple antennas at the same time to send and receive data. An AP operating in an MU-MIMO and in a 60 GHz frequency band may utilize an MU-MIMO frame to communicate with devices serviced by that AP.

One of the major features being introduced in IEEE 802.11ay is support to downlink (DL) MU-MIMO, that is, when a device such as an AP, can communicate with multiple devices in the DL direction. For example, in order for the AP to communicate with multiple devices, beamforming may be utilized to establish a reliable MIMO link. However, not all devices receiving the short sector sweep (SSW) frames need to be involved in the MU-MIMO communication with the AP. Consequently, the AP may not be able to be selective with which devices may receive SSW frames.

Example embodiments of the present disclosure relate to systems, methods, and devices for single user (SU) and multiuser (MU) multiple-input and multiple-output (MIMO) beamforming protocol.

In some demonstrative embodiments, one or more devices may be configured to communicate an SU or MU-MIMO frame, for example, over a 60 GHz frequency band. The one or more devices may be configured to communicate in a mixed environment such that one or more legacy devices are able to communicate with one or more non-legacy devices. That is, devices following one or more IEEE 802.11 specifications may communicate with each other regardless of which IEEE 802.11 specification is followed.

Directional multi-gigabit (DMG) communications may involve one or more directional links to communicate at a rate of multiple gigabits per second, for example, at least 1 gigabit per second, e.g., 7 gigabits per second, or any other rate. An amendment to a DMG operation in a 60 GHz band, e.g., according to an IEEE 802.11ad standard, may be defined, for example, by an IEEE 802.11ay project.

In some demonstrative embodiments, one or more devices may be configured to communicate over a next generation 60 GHz (NG60) network, an extended DMG (EDMG) network, and/or any other network. For example, the one or more devices may be configured to communicate over the NG60 or EDMG networks.

In some demonstrative embodiments, one or more devices may be configured to support the one or more mechanisms and/or features in a backwards compatible manner, for example, in a manner which may be compatible with one or more devices ("legacy devices"), which may not support these mechanisms and/or features, for example, one or more non-EDMG devices, (e.g., devices configured according to an IEEE 802.11ad standard), and the like. In one example, a legacy device, for example, a DMG device may include, may comply with, and/or may be configured according to a first specification, for example, an IEEE 802.11ad specification, while a non-legacy device, for example, an EDMG device, may include, may comply with, and/or may be configured according to a second specification, for example, an IEEE 802.11ay specification.

In one embodiment, an MIMO beamforming system may be structured in three phases, executed in this order: (1) phase 1: single input single output (SISO) phase; (2) phase 2: MIMO phase; and (3) phase 3: nulling phase. One or more goals of phase 1 are to collect feedback on one or more suitable antennas/sectors between an initiator (e.g., an AP) and each responder (e.g., a station device (STA)) and set up the protocol for the following phase 2. In phase 2, a focus may be to establish an MIMO link between the initiator and the responder. Then, on phase 3, poor links are nulled out of the MU-MIMO.

In one embodiment, an MIMO beamforming system may be implemented for phase 1 in order to collect feedback on suitable antennas and sectors between devices. This information may then be used for the subsequent phases, for example, phase 2 and phase 3.

In one embodiment, during a transmit (TX) sector sweep, two or more stations may exchange a series of SSW frames using different antenna sectors in order to find one or more antenna sectors providing the highest signal quality. The device that transmits is called the initiator, and the device that receives is called the responder.

In one embodiment, the MIMO beamforming system may establish and collect information on the best TX sectors from the initiator (e.g., an AP) to each of the responders (e.g., STAs) in preparation for the MIMO beamforming training of phase 2. That is, the MIMO beamforming system may perform a sector sweep using SSW frames in order to collect information from one or more user devices. However, in order to restrict the number of user devices that need to respond to the SSW frames, the MIMO beamforming system may define one or more fields within the SSW frames that may assist in selecting the STAs that should respond to the initiator. In one embodiment, the MIMO beamforming system may establish a media access control (MAC) protection for third-party STAs not to access the channel during phase 1 execution. The MIMO beamforming system may facilitate certain STAs to not participate in the beamforming or otherwise stay in a waiting state to send/receive frames to/from the initiator. This may be achieved by utilizing information included in the one or more SSW frames that these STAs may receive from the initiator during a sector sweep.

In one embodiment, the MIMO beamforming system may define an addressing scheme that is able to support individual, broadcast and group address modes and, in doing so, may enable power saving of STAs that receive frames transmitted during protocol execution. Instead of including specific STA addresses for all the STAs that may receive the SSW frames, the MIMO beamforming system may define an addressing mode field and a setup duration field within an SSW frame. It should be understood that since the SSW frame typically has a short size (only a few bits), the initiator cannot include the addresses of the STAs that are included in the MU-MIMO communication with the AP. In one embodiment, the MIMO beamforming system may utilize information included in management frames such as beacon frames, announce frames, or any other frames that may carry user identification information. The MIMO beamforming system may encode or otherwise include, in an SSW frame, addressing information associated with the user identification information. The addressing information may assist a user device receiving the SSW frame to determine whether the SSW frame is intended for it or whether the user device is part of a group of user devices that the initiator is seeking beamforming information from.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment of an MIMO beamforming system, according to some example embodiments of the present disclosure. Wireless network 100 may include one or more user device(s) 120 and one or more access point(s) (AP) 102, which may communicate in accordance with IEEE 802.11 communication standards, such as the IEEE 802.11ad and/or IEEE 802.11ay specifications. The user device(s) 120 may be mobile devices that are non-stationary and do not have fixed locations.

Figure 6:
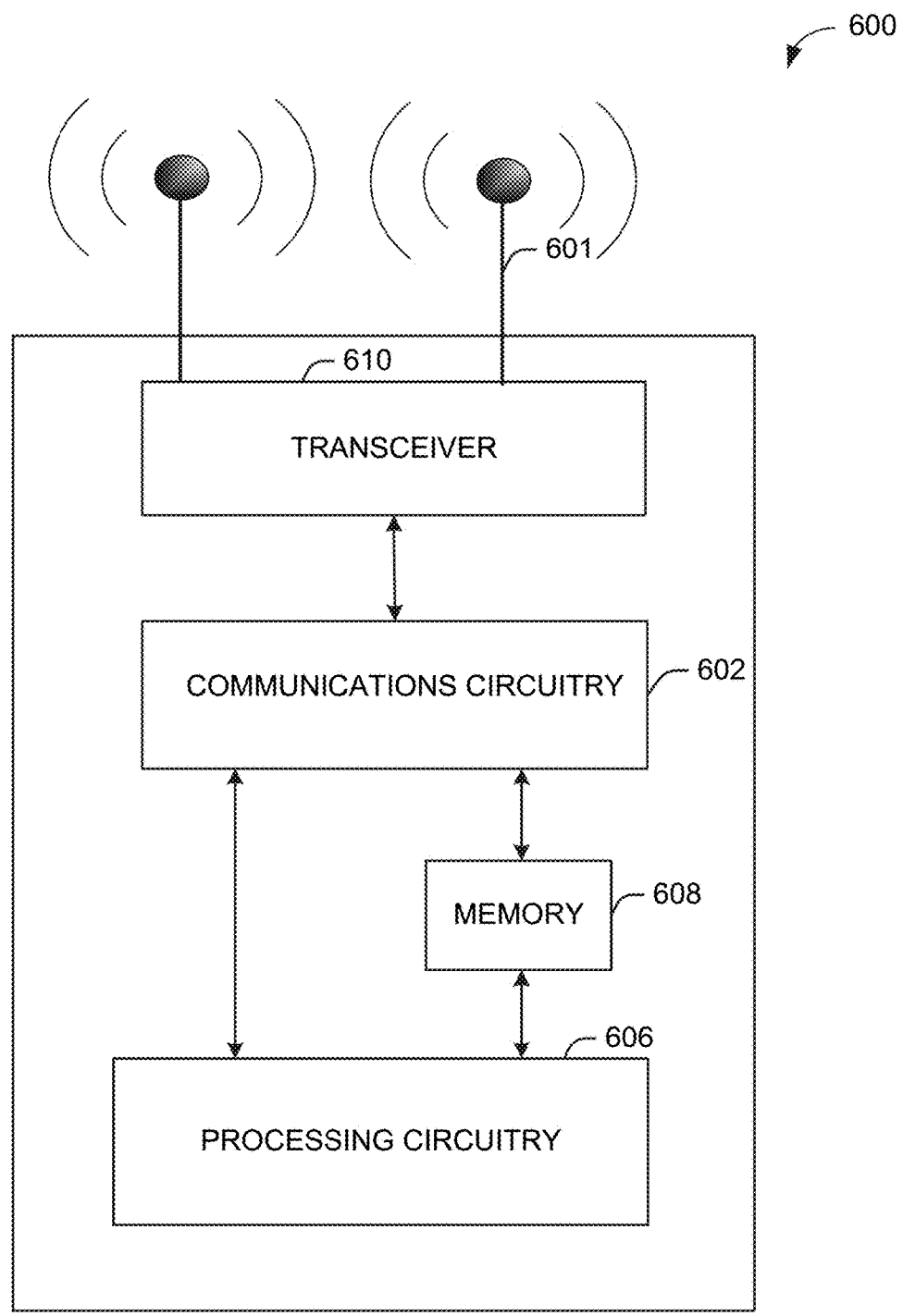
FIG. 6 illustrates a functional diagram of an example communication station that may be suitable for use as a user device, in accordance with one or more example embodiments of the disclosure.
Figure 7:
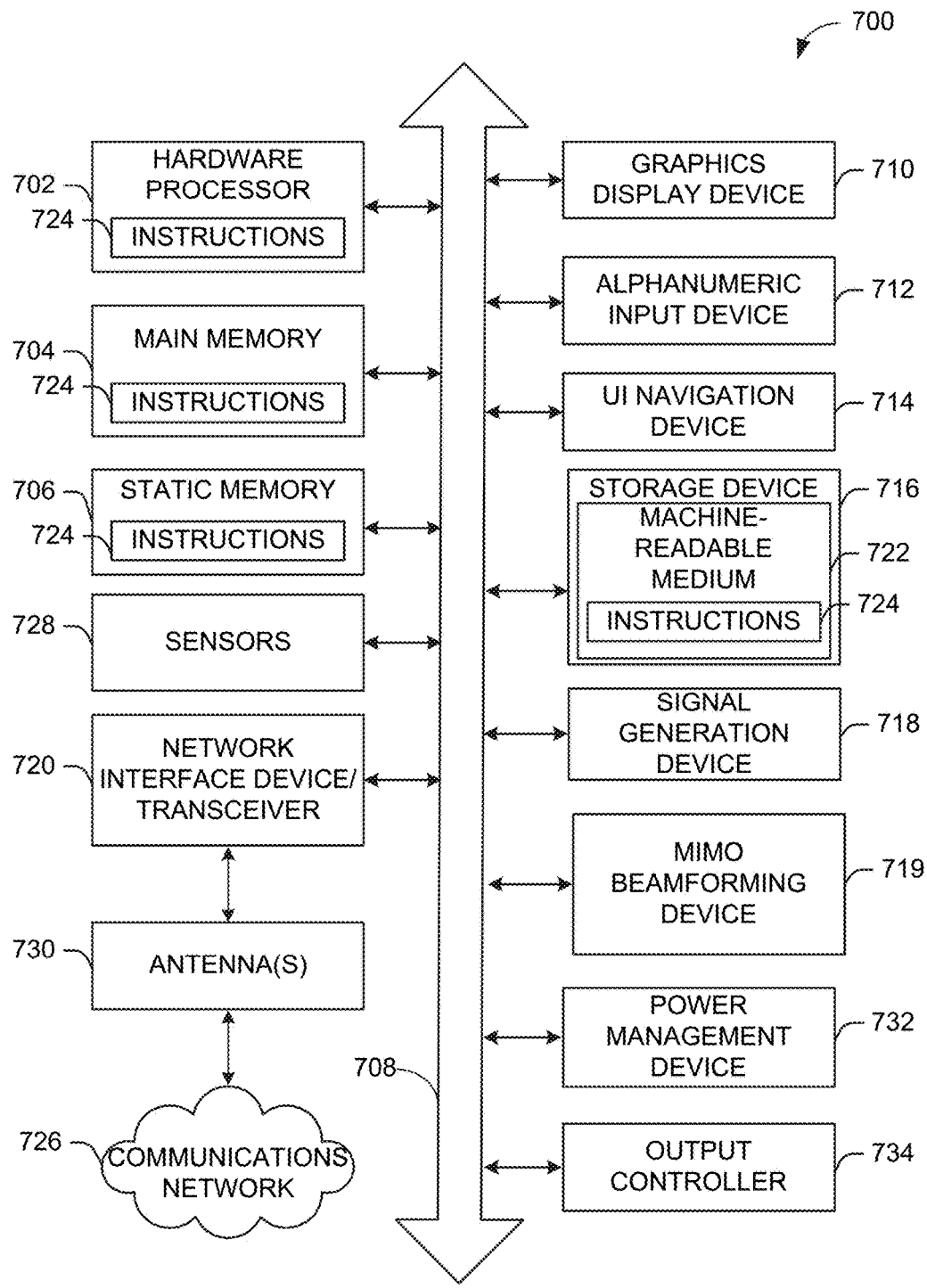
FIG. 7 is a block diagram of an example machine upon which any of one or more techniques (e.g., methods) may be performed, in accordance with one or more embodiments of the disclosure.

In some embodiments, the user device(s) 120 and the AP 102 may include one or more computer systems similar to that of the functional diagram of FIG. 6 and/or the example machine/system of FIG. 7.

One or more illustrative user device(s) 120 and/or the AP 102 may be operable by one or more user(s) 110. The user device(s) 120 (e.g., 124, 126, or 128) and/or the AP 102 may include any suitable processor-driven device including, but not limited to, a mobile device or a non-mobile, e.g., a static, device. For example, user device(s) 120 and/or the AP 102 may include, for example, a DMG device, an EDMG device, a UE, an MD, a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like.

Any of the user device(s) 120 (e.g., user devices 124, 126, 128), and the AP 102 may be configured to communicate with each other via one or more communications networks 130 and/or 135 wirelessly or wired. Any of the communications networks 130 and/or 135 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and the AP 102 may include one or more communications antennas. Communications antennas may be any suitable type of antenna corresponding to the communications protocols used by the user device(s) 120 (e.g., user devices 124, 126 and 128), and the AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user device(s) 120.

Any of the user device(s) 120 (e.g., user devices 124, 126, 128), and/or the AP 102 may include any suitable radio and/or transceiver for transmitting and/or receiving radio frequency (RF) signals in the bandwidth and/or channels corresponding to the communications protocols utilized by any of the user device(s) 120 and/or the AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHz channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, a frequency band according to the WGA specification, and the like.

The phrases "directional multi-gigabit" (DMG) and "directional band" (DBand), as used herein, may relate to a frequency band wherein the channel starting frequency is above 45 GHz. In one example, DMG communications may involve one or more directional links to communicate at a rate of multiple gigabits per second, for example, at least 1 gigabit per second, e.g., 7 gigabits per second, or any other rate.

In some demonstrative embodiments, the user device(s) 120 and/or the AP 102 may be configured to operate in accordance with one or more specifications, for example, including one or more IEEE 802.11 specifications, e.g., an IEEE 802.11ad specification, an IEEE 802.11ay specification, and/or any other specification and/or protocol. For example, an amendment to a DMG operation in the 60 GHz band, e.g., according to an IEEE 802.11ad standard, may be defined, for example, by an IEEE 802.11ay project.

Some communications over a wireless communication band, for example, a DMG band, may be performed over a single channel bandwidth (BW). For example, the IEEE 802.11ad specification defines a 60 GHz system with a single channel bandwidth (BW) of 2.16 GHz, which is to be used by all stations (STAs) for both transmission and reception.

In some demonstrative embodiments, the devices may be configured to implement one or more mechanisms, which may, for example, enable to extend a single-channel BW scheme, e.g., according to the IEEE 802.11ad specification, for higher data rates and/or increased capabilities.

Some specifications, e.g., an IEEE 802.11ad specification, may be configured to support a single user (SU) system, in which an STA cannot transmit frames to more than a single STA at a time. Such specifications may not be able, for example, to support a STA transmitting to multiple STAs simultaneously, for example, using a multi-user (MU) MIMO (MU-MIMO) scheme, e.g., a downlink (DL) MU-MIMO, or any other MU scheme.

In some demonstrative embodiments, user device(s) 120 and/or the AP 102 may be configured to implement one or more MU mechanisms. For example, the user device(s) 120 and/or the AP 102 may be configured to implement one or more MU mechanisms, which may be configured to enable MU communication of downlink (DL) frames using an MIMO scheme, for example, between a device, e.g., the AP 102, and a plurality of user devices, e.g., including the user device(s) 120 and/or one or more other devices.

In some demonstrative embodiments, user device(s) 120 and/or the AP 102 may be configured to communicate over a next generation 60 GHz (NG60) network, an extended DMG (EDMG) network, and/or any other network. For example, user device(s) 120 and/or the AP 102 may be configured to communicate MIMO, e.g., DL MU-MIMO, transmissions and/or use channel bonding, for example, for communicating over the NG60 and/or EDMG networks.

In some demonstrative embodiments, user device(s) 120 and/or the AP 102 may be configured to support one or more mechanisms and/or features, for example, channel bonding, single user (SU) MIMO, and/or MU-MIMO, for example, in accordance with an EDMG standard, an IEEE 802.11 ay standard, and/or any other standard and/or protocol.

In one embodiment, and with reference to FIG. 1, an initiator (e.g., the AP 102) may be configured to communicate using an SU and/or an MU-MIMO technique, for example, over a 60 GHz frequency band with one or more responders (e.g., non-AP STAs, such as the user devices 120).

For example, in order for the AP 102 to establish an MU-MIMO communication with two devices (e.g., user device 124 and user device 128), the AP 102 may need to perform beamforming training with the user device 124 and the user device 128. Additionally, the user device 126 may not be part of the MU-MIMO communication. The AP 102 may transmit one or more SSW frames over different antenna sectors defined by the one providing high signal quality between the AP 102 and the user device 124 and the user device 128. However, the SSW frames may reach the user device 126. When the user device 126 receives the SSW frames, the user device 126 may need to be aware that it is not part of the MU-MIMO communication.

In one embodiment, a DL MIMO system may facilitate the AP 102 to notify the user device 126 that it is not part of the MU-MIMO communication. Since each SSW frame typically has a short size, it cannot accommodate the addresses of the intended users (e.g., the user device 124 and the user device 128) for the MU-MIMO communication. The DL MIMO system may utilize one or more addressing fields within the SSW frame in order to notify the user device 126 that it is not part of the MU-MIMO communication. In that case, the user device 126 may power off or otherwise go into an inactive state since it is not required for the beamforming training. Further, the user devices 124 and 128 may determine based at least in part on the SSW frames that they are the intended users for the MU-MIMO communication. In that case, the user devices 124 and 128 may perform beamforming training with the AP 102, resulting in a beam having the highest signal strength (e.g., beam 104) with the user device 124 and another beam having the high signal strength (e.g., beam 106) with the user device 128. In turn, this will establish a MIMO link between the AP 102 and the user device 124 and another MIMO link between the AP 102 and the user device 128.

Figure 2:
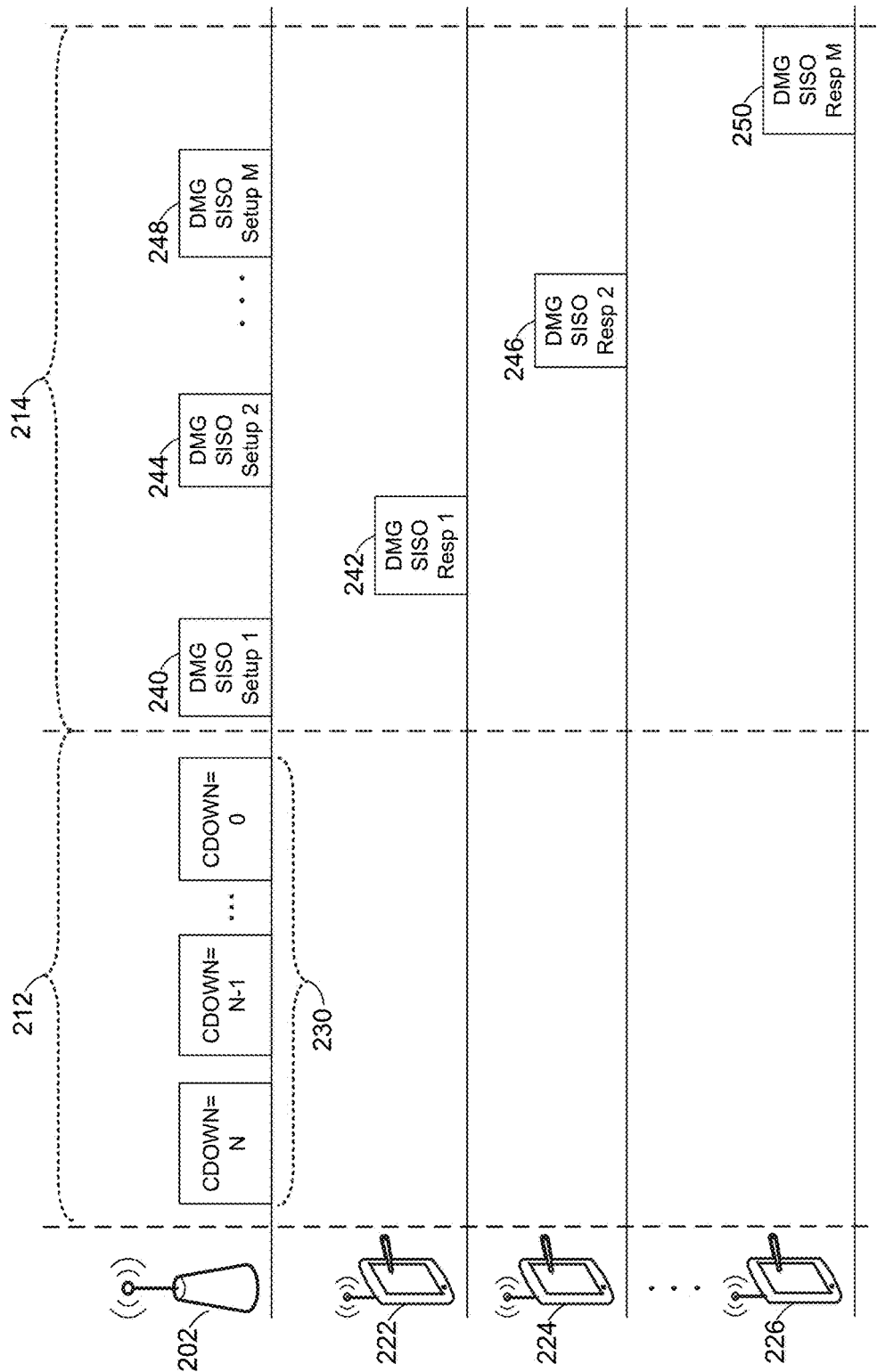
FIG. 2 depicts an illustrative schematic diagram of an MIMO beamforming system, in accordance with one or more example embodiments of the present disclosure.

FIG. 2 depicts an illustrative schematic diagram of an MIMO beamforming system, in accordance with one or more example embodiments of the present disclosure.

When an initiator device (e.g., the AP 202) and one or more intended responder devices (e.g., user devices, 222, 224, and 226) are used, the initiator device may set up a control physical layer (PHY) link between the initiator device and each intended responder devices.

In one embodiment, after establishing the control PHY links, the initiator device may perform a sector sweep by sending one or more SSW frames that may be received by one or more devices, even if they are not the intended responder devices. Specifically, phase 1 may consist of one or more subphases (e.g., subphase 212 and subphase 214) as illustrated in FIG. 2. The one or more SSW frames may include information associated with the SSW packet transmissions. For example, an SSW frame may include a countdown field (CDOWN) which may be set to the number of SSW packet transmissions. For example, if there are N SSW packets to be sent, where N is a positive integer, each SSW frame would include a CDOWN value to indicate the number of remaining SSW packet transmissions. That is, the first SSW frame would have a CDOWN value set to N, the next SSW frame would have a CDOWN value set to N−1, until the last SSW frame, which would have the CDOWN value set to "0" indicating the last SSW packet transmission.

Subphase 212 may consist of an optional initiator transmit (TX) sector sweep (I-TXSS), where one or more SSW frames are sent from the initiator device to the one or more devices (intended or not intended). The subphase 212 may be needed if the initiator device has not yet discovered all suitable links with the responder device(s). A second subphase (e.g., subphase 214) may consist of DMG SIS Setup message and DMG SISO response frame exchanges between the initiator device and the intended responder device(s) to collect feedback and in order to set up phase 2.

In one embodiment, during the I-TXSS subphase 212, the initiator device or AP 202 may perform a sector sweep of one or more SSW frames 230. During the sector sweep, an intended responder device (e.g., user device 222, user device 224, or user device 226) may obtain a set of antenna/sector, signal to noise ratio (SNR), and received signal strength indicator (RSSI) measurements from the initiator device to the responder device. However, the AP 202 may not need that information from each of the devices that may have received one or more of the SSW frames 230. The AP 202 may only need to be in an MIMO communication with a subset of the one or more devices. In this example, the AP 202 may only need to be in MIMO communication with the user devices 222, 224, and 226. Other devices that may be in the range of the AP 202 may also receive at least one of the one or more SSW frames 230.

As shown in FIG. 2, in the second subphase 214, the AP 202 may send a DMG SISO setup message 240 to the user device 222, which is an intended responder device of the MIMO communication with the AP 202. The user device 222 may respond with a DMG SISO response message 242. This exchange of messages is to determine the best TX sectors from the AP 202 to the user device 222 in preparation for the MIMO beamforming training of phase 2.

All intended responder devices may perform this same operation. For example, the user device 224 may receive the DMG SISO setup message 244 and may respond with the DMG SISO response message 246. Similarly, the user device 226 may receive the DMG SISO setup message 248 and may respond with the DMG SISO response message 250.

It is understood that the above descriptions are for purposes of illustration and are not meant to be limiting.

Figure 3:
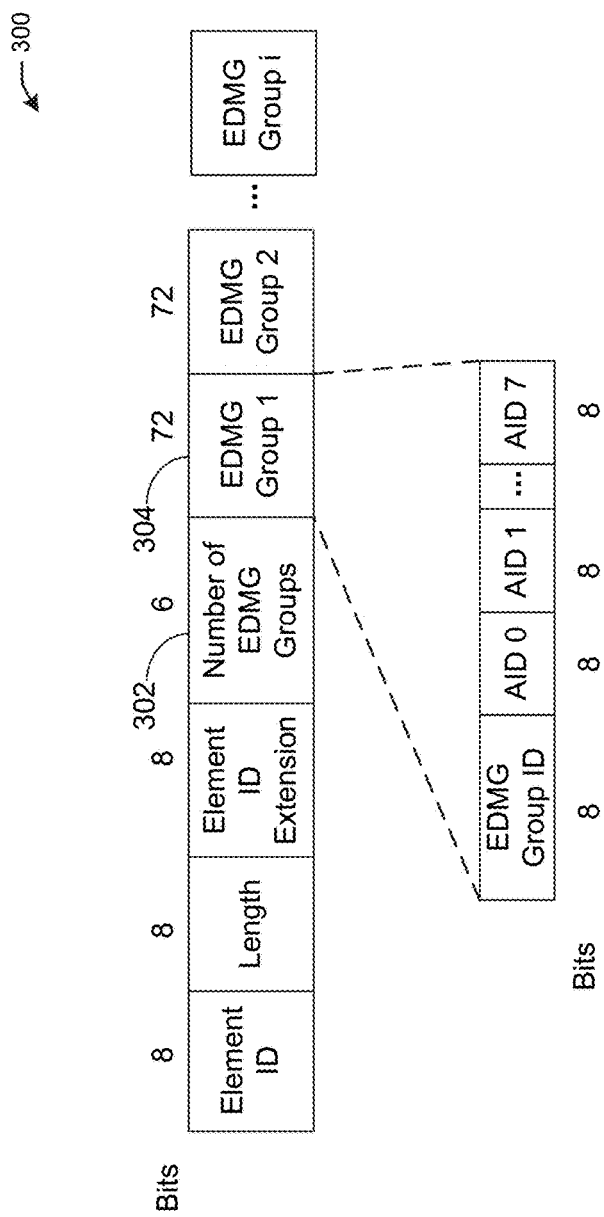
FIG. 3 depicts an illustrative schematic diagram of an information element (IE), in accordance with one or more example embodiments of the present disclosure.

FIG. 3 depicts an illustrative schematic diagram of an EDMG information element (IE) 300, in accordance with one or more example embodiments of the present disclosure.

The EDMG IE 300 may contain one or more fields including, but not limited to, an element ID field, a length field, an element ID extension field, a number of EDMG groups field 302, an EDMG group field 304, plus additional EDMG group fields. For example, the number of EDMG groups field 302 may indicate how many EDMG groups are included in the EDMG IE 300. The EDMG group field 304 may contain information associated with one or more STAs. For example, the EDMG group field 304, may contain information such as an EDMG Group ID and one or more STA IDs (e.g., AID 0, AID 1, . . . , AID 7) that belong to the EDMG group 304. Although in this case eight AIDs are shown, it should be appreciated that other numbers of AIDs may be utilized.

In this example, the EDMG IE 300 may include at least in part EDMG Groups 1, 2, . . . , i, where i is a positive integer indicating the number of EDMG Groups within this EDMG IE 300. That information may also be included in the number of EDMG groups field 302 of the EDMG IE 300.

The EDMG IE 300 may contain one or more fields that may be used for purposes such as determining a number of user devices that are part of one group.

The EDMG IE 300 may be included or otherwise attached to one or more management frames such as beacon frames, announce frames, or any other frames that may carry user identification information. Management frames are used for network management and state synchronization between one or more devices. It is understood that a beacon frame is one of the management frames in IEEE 802.11 based WLANs. The beacon frame may contain information about the network. Beacon frames are transmitted periodically to announce the presence of a wireless LAN. Beacon frames are transmitted by the AP in an infrastructure basic service set (IBSS). In an IBSS network, beacon generation is distributed among the stations (STAs). Similar to a beacon frame, an announce frame may be sent to one or more STAs in order to announce certain management information associated with the network.

In one embodiment, an MIMO beamforming system may utilize at least one of the fields of the EDMG IE 300 in order to facilitate identification of the STAs that are addressed or intended by an initiator device (e.g., an AP). In that sense, any STAs that receive the one or more SSW frames and are not addressed or intended by the initiator device may refrain from participating in the beamforming training. These STAs then may be restricted from accessing the channel during a predetermined duration of the beamforming training between the initiator device and the STAs that are addressed or intended by the initiator device. This may result in power saving on the STAs that are not addressed or intended by the initiator device, since they are not required for the beamforming training. It is understood that the above descriptions are for purposes of illustration and are not meant to be limiting.

Figure 4:
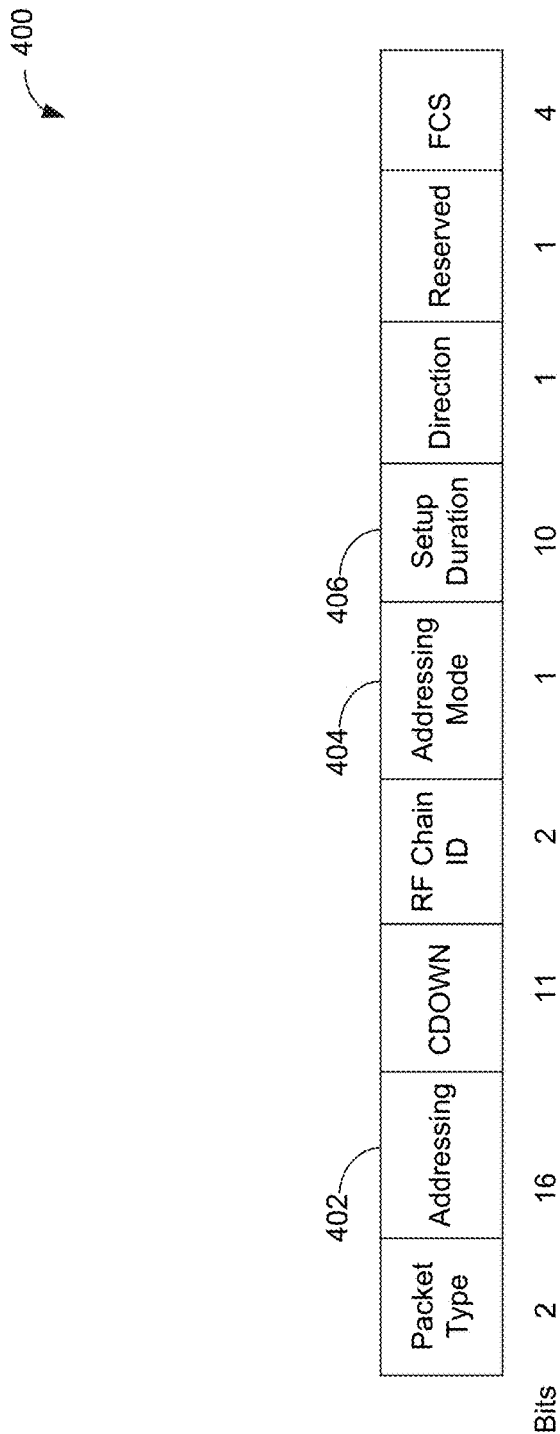
FIG. 4 depicts an illustrative schematic diagram of a short sector sweep frame, in accordance with one or more example embodiments of the present disclosure.

FIG. 4 depicts an illustrative schematic diagram of an SSW frame 400, in accordance with one or more example embodiments of the present disclosure.

Two problems may arise during the I-TXSS subphase of FIG. 2, as a result of using the one or more SSW frames. The first problem may be that the I-TXSS may be very long covering up to 2,048 sectors resulting in multiple SSW frames. The second problem may be the duration of phase 1.

In the first problem, the EDMG STAs may not be able to determine as soon as possible whether or not they are part of beamforming training, so that they decide to, for example, stay awake, or go into an inactive state or power off. While this may be done through the addressing field of the SSW frame for unicast (one STA) and broadcast (all STAs) transmissions, there may be no way to identify a subset or a group of STAs. In addition, without being able to address a group of STAs, the entire purpose of MU-MIMO beamforming is negated.

In one embodiment, the SSW frame 400 may include one or more fields that may assist an STA in determining whether it is part of an MIMO communication with an initiator device or not. The one or more fields may include at least one of a packet type, an addressing field 402, a down-counter (CDOWN) field, an RF chain ID field, an addressing mode field 404, a setup duration field 406, a direction field, a reserved field, and a frame check sequence (FCS) field. It should be appreciated that FCS refers to the extra error-detecting code added to a frame in a communications protocol.

The packet type field may indicate the type of packet being sent. For example, the packet type may be set to an SSW type packet. The addressing field 402 may contain address information associated with a user device (e.g., an STA), the CDOWN field may indicate the number of remaining SSW packet transmissions, the RF chain ID field may identify the RF chain that the initiator device is currently using for the current transmission, and the addressing mode field 404 may indicate whether there is an individual address or a broadcast or group address. For example, if the addressing mode field 404 is set to "1," this may indicate that the current transmission is for an MIMO communication with multiple devices. If the addressing mode field 404 is set to "0," this may indicate that the current transmission is for an SU communication with one user device.

For the specific case of when a group address is used, the definition of a new EDMG Group ID set element may be defined to associate a group ID with a group of STAs. With this element, an EDMG STA that receives a group addressed SSW may determine whether it is part of the beamforming training. For example, if an STA is part of the group, it continues performing the procedure throughout the end of phase 1. In addition, if the STA is not part of the group, it may set the NAV for the duration of phase 1 and can doze or go into an inactive state. In one embodiment, the EDMG Group ID set element can be transmitted in DMG beacon and announce frames. In the second problem, the SSW frame does not include a duration field. Instead, the STAs use the CDOWN field to compute the end of the I-TXSS. However, this is not sufficient to cover the entire duration of phase 1, which also includes the setup subphase as shown in FIG. 2.

In one embodiment, to address the second problem, an SU and MU-MIMO beamforming system may facilitate the use of the remaining 10 bits of the SSW frame to define a new setup duration field 406. The setup duration field 406 may specify the duration, in microseconds, of the following setup subphase. With 10 bits, up to 1,024 microseconds may be indicated, which may accommodate 16 frame exchanges when the modulation and coding scheme (MCS) (e.g., MCS0) is used. The setup duration field 406 may indicate the duration of phase 1. That is, the setup duration field 406 may indicate to an STA that receives the SSW frame 400 how long phase 1 will be. In case the STA is an unintended device, which the AP does not need to be in an MIMO communication with, then based on the setup duration field 406, the STA may determine how long to keep away from the channel or how long to go into an inactive state resulting in a power savings for the STAs that are unintended recipients of the SSW frame. With this duration field defined, the MIMO beamforming system may allow STAs receiving an SSW frame to correctly determine the duration and, if applicable, set the NAV until the end of phase 1. It is understood that the above descriptions are for purposes of illustration and are not meant to be limiting.

Referring back to FIG. 2, during the setup subphase, an initiator and responder(s) may exchange frames that support collection of feedback and set up phase 2.

As shown in FIG. 2, the MIMO beamforming system may facilitate a polled approach where the initiator device may transmit a frame (e.g., the DMG SISO setup frame) to each responder device (e.g., the STA) individually. This polling approach is simpler and more robust from an implementation perspective, while at the same time being able to deal with response frames of different durations. The order in which STAs are polled may be announced to the responder devices. For example, the order can be the same order in which the STAs appear in the EDMG IE 300 shown in FIG. 3.

In one embodiment, if an I-TXSS was present immediately prior to the start of the setup subphase (e.g., subphase 214 of FIG. 2), the duration of the setup subphase may not exceed the value of the setup duration field 406 indicated in the SSW frame 400. In addition, the duration field in an MAC header of each of the setup/response messages (e.g., the DMG SISO setup message 240, and the DMG SISO response message 242 associated with the user device 222) may point to the end of phase 1.

In one embodiment, a channel measurement feedback element, or a modified version of it, may be included in the DMG SISO response frame (e.g., the DMG SISO responses 242, 246 and 250 of FIG. 2) and may include a list of received antennas/sectors and their corresponding SNR/RSSI.

It is understood that the above descriptions are for purposes of illustration and are not meant to be limiting.

Figure 5A:
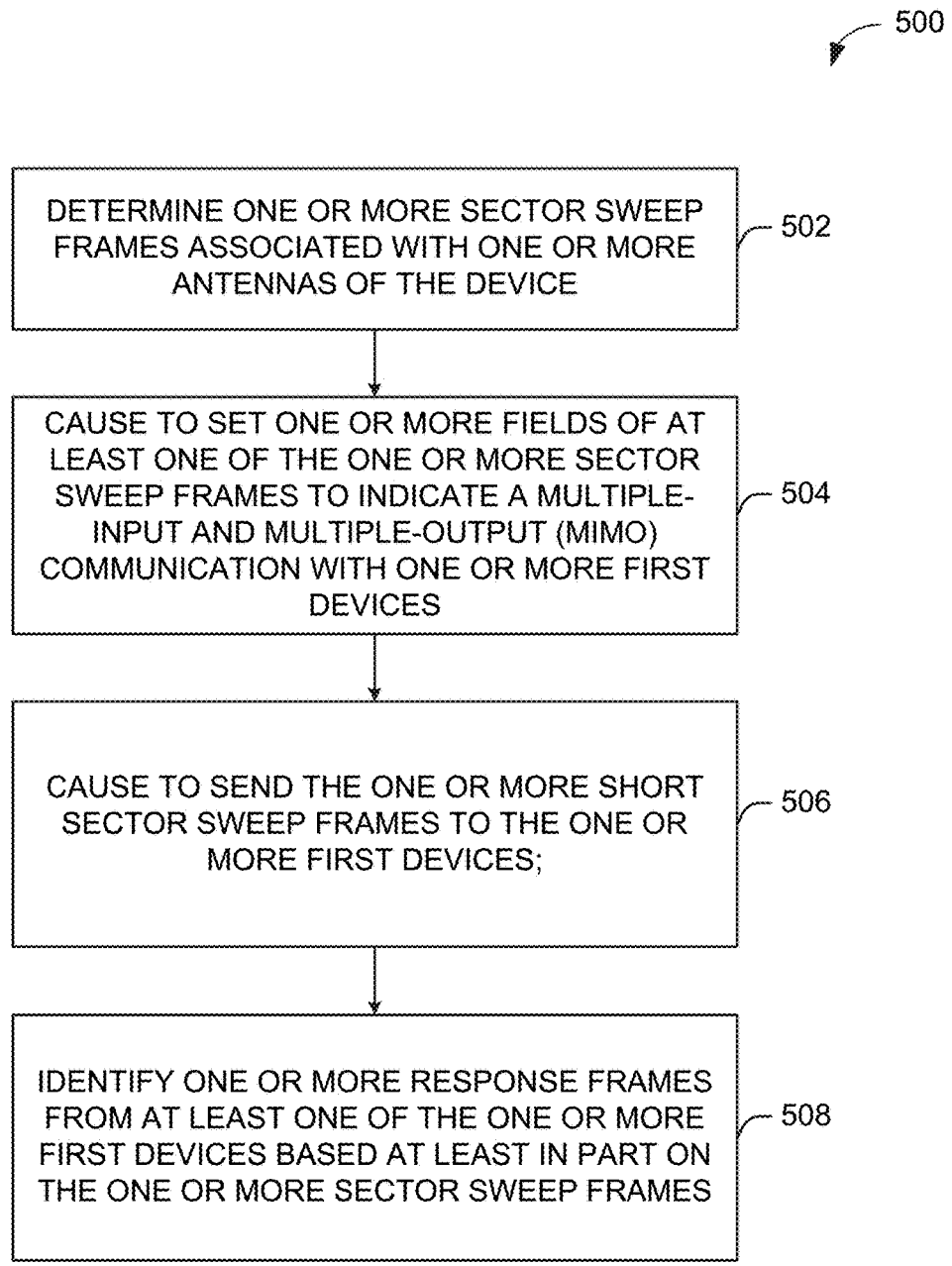
FIGS. 5A and 5B depict flow diagrams of illustrative processes for an illustrative MIMO beamforming system, in accordance with one or more embodiments of the disclosure.

FIG. 5A illustrates a flow diagram of an illustrative process 500 for an MIMO beamforming system, in accordance with one or more embodiments of the disclosure.

At block 502, an initiator device (e.g., the AP 102 of FIG. 1) may determine one or more short sector sweep frames associated with one or more antennas of the initiator device.

When an initiator device (e.g., the AP 202) and one or more intended responder devices (e.g., the user devices, 222, 224, and 226), the initiator device may set up a control physical layer (PHY) link between the initiator device and each intended responder device.

After establishing the control PHY links, the initiator device may perform a sector sweep by sending one or more SSW frames that may be received by one or more devices, even if they are not the intended responder devices.

The initiator device may determine one or more information elements (IEs) associated with the one or more SSW frames. For example, the IEs may be EDMG IEs. The EDMG IE may contain one or more fields including, but not limited to, an element ID field, a length field, an element ID extension field, a number of EDMG groups field, an EDMG group field, plus additional EDMG group fields. For example, the number of EDMG groups field may indicate how many EDMG groups are included in the EDMG IE. The EDMG group field may contain information associated with one or more STAs. For example, the EDMG group may contain information such as an EDMG group ID and one or more STA IDs (e.g., AID 0, AID 1, . . . , AID 7) that belong to the EDMG group.

At block 504, the initiator device may cause to set one or more fields of at least one of the one or more SSW frames to indicate a multiple-input and multiple-output (MIMO) communication with one or more responder devices (e.g., a user device 120 of FIG. 1).

For example, the initiator device may include in the SSW frame fields information that may assist an STA in determining whether it is part of an MIMO communication with an initiator device or not. The one or more fields may include at least one of a packet type, an addressing field, a down-counter (CDOWN) field, an RF chain ID field, an addressing mode field, a setup duration field, a direction field, a reserved field, and a frame check sequence (FCS) field. The initiator device may set the addressing field, the addressing mode field, and the setup duration field to assist a responder device receiving this SSW frame in determining whether the responder device is an intended user device for the MIMO communication with the initiator device. For example, the initiator device may set the addressing mode field to "1" indicating that the current transmission is for an MU-MIMO communication with multiple devices. If the addressing field is set to "0," this may indicate that the current transmission is for an SU communication with one user device. In the case of MU-MIMO communication, a responder device receiving the SSW frame may determine that the SSW is intended for MU-MIMO communication. The responder device may then determine from the addressing field information associated with the EDMG groups that was indicated in the EDMG IEs. For example, if the responder device determines that it belongs to one of the group IDs indicated in the EDMG IE, the responder device may then participate in the MIMO communication by establishing and collecting information on best transmit (TX) sectors from the initiator device to the responder device. However, if the responder device determines that it does not belong to the one or more group IDs indicated in the EDMG IE, the responder device may then doze or go into an inactive state and not access the channel for a predetermined duration. The predetermined duration may be indicated in the setup duration field of the SSW frame. The responder device would determine how long to keep away from the channel or how long to go into an inactive state based at least in part on the setup duration field of the SSW frame.

At block 506, the initiator device may cause to send the one or more short sector sweep frames to the one or more first devices. For example, in order for an AP to communicate with multiple devices, beamforming may be utilized to establish a reliable MIMO link. However, not all devices receiving the SSW frames need to be involved in the MU-MIMO communication with the AP. Consequently, the AP may not be able to be selective with which devices may receive SSW frames.

At block 508, the initiator device may identify one or more response frames from at least one of the one or more first devices based at least in part on the one or more SSW frames. In the case where the responder device determines that it does belong to at least one of the group IDs indicated in the EDMG IE, the responder device will then continue communication with the initiator device. The initiator device may send a setup message (e.g., a DMG SISO setup message), to which the responder device may send a response message (e.g., a DMG SISO response message). This exchange of messages is meant to collect feedback information associated with the best TX sectors and to prepare for phase 2 of the MIMO communication. It is understood that the above descriptions are for purposes of illustration and are not meant to be limiting.

Figure 5B:
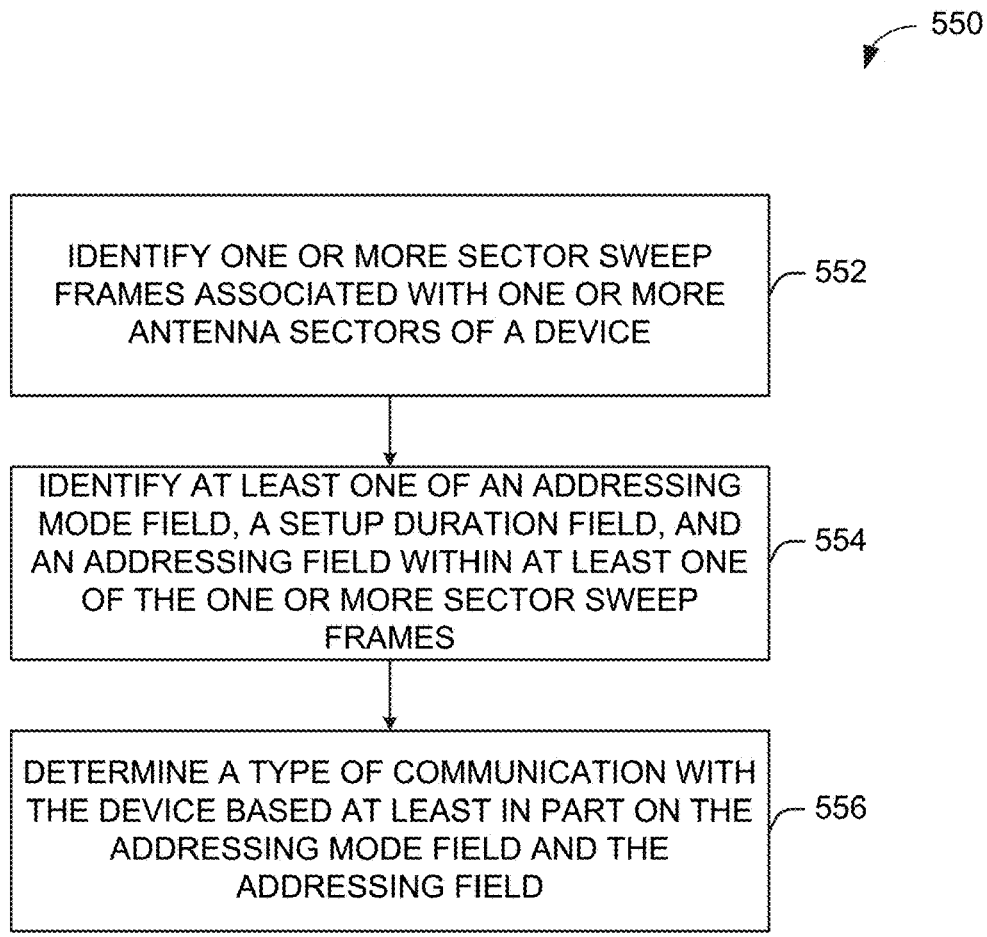

FIG. 5B illustrates a flow diagram of an illustrative process 550 for an MIMO beamforming system, in accordance with one or more example embodiments of the present disclosure.

At block 552, a responder device (e.g., the user device(s) 120 of FIG. 1) may identify one or more SSW frames associated with one or more antenna sectors of a device. For example, the responder device may receive one or more SSW frames from an initiator device (e.g., the AP 102 of FIG. 1).

At block 554, the responder device may identify at least one of an addressing mode field, a setup duration field, and an addressing field within at least one of the one or more sector SSW frames. The SSW frame may include one or more field that may assist an STA in determining whether it is part of an MIMO communication with an initiator device or not. The one or more fields may include at least one of a packet type, an addressing field, a down-counter (CDOWN) field, an RF chain ID field, an addressing mode field, a setup duration field, a direction field, a reserved field, and an FCS field.

At block 556, the responder device may determine a type of communication with the device based at least in part on the addressing mode field and the addressing field. For example, the responder device may decode or otherwise read the addressing mode field in order to determine the type of communication with the initiator device. For example, the initiator device may set the addressing mode field to "1" indicating that the current transmission is for an MU-MIMO communication with multiple devices. The initiator device may set the addressing field to "0" to indicate that the current transmission is for an SU communication between the initiator device and another user device. In the case where the addressing mode field is set to "1," the responder device may be an intended user device of an MIMO communication with the initiator device. In order for the responder device to determine whether it is an intended receiver of the SSW frame, the responder device may decode or otherwise read the addressing field. The responder device may then determine from the addressing field information associated with the EDMG groups that was indicated in the EDMG IEs. For example, if the responder device determines that it belongs to one of the group IDs indicated in the EDMG IE, the responder device may then participate in the MIMO communication by establishing and collecting information on best transmit (TX) sectors from the initiator device to the responder device. However, if the responder device determines that it does not belong to the one or more group IDs indicated in the EDMG IE, the responder device may then doze or go into an inactive state and not access the channel for a predetermined duration. The predetermined duration may be indicated in the setup duration field of the SSW frame. The responder device would determine how long to keep away from the channel or how long to go into an inactive state based at least in part on the setup duration field of the SSW frame. It is understood that the above descriptions are for purposes of illustration and are not meant to be limiting.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1) or a user device 120 (FIG. 1) in accordance with some embodiments. The communication station 600 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 1, 2, 3, 4, 5A, and 5B.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), a MIMO beamforming device 719, a network interface device/transceiver 720 coupled to antenna(s) 730, and one or more sensors 728, such as a global positioning system (GPS) sensor, compass, accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The MIMO beamforming device 719 may carry out or perform any of the operations and processes (e.g., the processes 500 and 550) described and shown above. For example, the MIMO beamforming device 719 may be configured to execute three phases, in the following order: (1) phase 1: SISO phase; (2) phase 2: MIMO phase; and (3) phase 3: nulling phase. One or more goals of phase 1 are to collect feedback on one or more suitable antennas/sectors between an initiator device (e.g., an AP) and each responder devices (e.g., STAs) and set up the protocol for the following phase 2. In phase 2, a focus may be to establish an MIMO link between the initiator and responder using the information received in phase 1. Then, during phase 3, poor links are nulled out of the single user (SU) or multi-user (MU) MIMO communication.

The MIMO beamforming device 719 may be configured to be implemented for phase 1 of an SU or MU-MIMO communication between an initiator device and one or more responder device(s).

The MIMO beamforming device 719 may be configured to establish and collect information on best transmit (TX) sectors from the initiator device (e.g., an AP) to each of the responder device(s) (e.g., STA(s)) in preparation for SU or MU-MIMO beamforming training.

The MIMO beamforming device 719 may be configured to establish a media access control (MAC) protection for third-party STAs not to access the channel during phase 1 execution.

The MIMO beamforming device 719 may be configured to define an addressing scheme that is able to support individual, broadcast and group address modes and, in doing so, may enable power saving of STAs that receive frames transmitted during protocol execution.

It is understood that the above are only a subset of what the MIMO beamforming device 719 may be configured to perform and that other functions included throughout this disclosure may also be performed by the MIMO beamforming device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes (e.g., processes 400 and 500) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

According to example embodiments of the disclosure, there may be a device. The device may include memory and processing circuitry configured to determine one or more short sector sweep frames associated with one or more antennas of the device. The memory and processing circuitry may be further configured to cause to set one or more fields of at least one of the one or more short sector sweep frames to indicate a multiple-input and multiple-output (MIMO) communication with one or more first devices. The memory and processing circuitry may be further configured to cause to send the one or more short sector sweep frames to the one or more first devices. The memory and processing circuitry may be further configured to identify one or more response frames from at least one of the one or more first devices based at least in part on the one or more short sector sweep frames.

The implementations may include one or more of the following features. The memory and the processing circuitry are further configured to determine one or more information elements associated with the one or more short sector sweep frames. The one or more information elements include at least in part one or more group IDs associated with the at least one of the one or more first devices. The one or more short sector sweep frames include at least in part an addressing mode field, a duration field, and an addressing field. The addressing mode field indicates that the MIMO communication is a multiuser (MU) communication or a single user (SU) communication with at least one of the one or more first devices. The addressing field is associated with the one or more group IDs. The memory and the processing circuitry are further configured to assign the at least one of the one or more first devices to at least one of the one or more group IDs. The memory and the processing circuitry are further configured to cause to send one or more setup frames associated with the one or more first devices. The device may further include a transceiver configured to transmit and receive wireless signals. The device may further include one or more antennas coupled to the transceiver.

According to example embodiments of the disclosure, there may be a device. The device may include memory and processing circuitry configured to identify one or more short sector sweep frames associated with one or more antenna sectors of a device. The memory and processing circuitry may be further configured to identify at least one of an addressing mode field, a duration field, and an addressing field within at least one of the one or more short sector sweep frames. The memory and processing circuitry may be further configured to determine a type of communication with the device based at least in part on the addressing mode field and the addressing field.

The implementations may include one or more of the following features. The memory and the processing circuitry are further configured to identify one or more information elements (IEs) received in at least one of a beacon frame, an announce frame, or a trigger frame, wherein the one or more IEs include at least in part one or more group IDs associated with one or more first devices. The type of communication is at least one of a single user or a multiuser multiple-input multiple-output (MIMO) communication. The addressing field is associated with the one or more group IDs. The one or more short sector sweep frames include at least in part an addressing mode field, a duration field, and an addressing field. The memory and the processing circuitry may be further configured to determine a device identification (ID) associated with one of the one or more first devices. The memory and processing circuitry may be further configured to determine the device ID is associated with the one or more group IDs. The memory and processing circuitry may be further configured to identify an MIMO setup message received from the device. The memory and processing circuitry may be further configured to cause to send an MIMO response message to the device. The memory and the processing circuitry may be further configured to determine a device identification (ID) associated with one of the one or more first devices. The memory and processing circuitry may be further configured to determine the device ID is not associated with the one or more group IDs. The memory and processing circuitry may be further configured to cause to enter an inactive mode for a time duration included in the duration field of at least one of the one or more short sector sweep frames.

According to example embodiments of the disclosure, there may be a non-transitory computer-readable medium storing computer-executable instructions which, when executed by a processor, cause the processor to perform operations. The operations may include identifying one or more short sector sweep frames associated with one or more antenna sectors of a device. The operations may include identifying at least one of an addressing mode field, a duration field, and an addressing field within at least one of the one or more short sector sweep frames. The operations may include determining a type of communication with the device based at least in part on the addressing mode field and the addressing field.

The implementations may include one or more of the following features. The operations may further include identifying one or more information elements (IEs) received in at least one of a beacon frame, an announce frame, or a trigger frame, wherein the one or more IEs include at least in part one or more group IDs associated with one or more first devices. The type of communication is at least one of a single user or a multiuser multiple-input multiple-output (MIMO) communication. The addressing field is associated with the one or more group IDs. The one or more short sector sweep frames include at least in part an addressing mode field, a duration field, and an addressing field. The operations may further include determining a device identification (ID) associated with one of the one or more first devices. The operations may include determining the device ID is associated with the one or more group IDs. The operations may include identifying an MIMO setup message received from the device. The operations may include causing to send an MIMO response message to the device. The operations may further include determining a device identification (ID) associated with one of the one or more first devices. The operations may include determining the device ID is not associated with the one or more group IDs. The operations may include causing to enter an inactive mode for a time duration included in the duration field of at least one of the one or more short sector sweep frames.

According to example embodiments of the disclosure, there may be a non-transitory computer-readable medium storing computer-executable instructions which, when executed by a processor, cause the processor to perform operations. The operations may include determining one or more short sector sweep frames associated with one or more antennas of a device. The operations may include setting one or more fields of at least one of the one or more short sector sweep frames to indicate a multiple-input and multiple-output (MIMO) communication with one or more first devices. The operations may include sending the one or more short sector sweep frames to the one or more first devices. The operations may include identifying one or more response frames from at least one of the one or more first devices based at least in part on the one or more short sector sweep frames.

The implementations may include one or more of the following features. The operations may further include determining one or more information elements associated with the one or more short sector sweep frames. The one or more information elements include at least in part one or more group IDs associated with the at least one of the one or more first devices. The one or more short sector sweep frames include at least in part an addressing mode field, a duration field, and an addressing field. The addressing mode field indicates that the MIMO communication is a multiuser (MU) communication or a single user (SU) communication with at least one of the one or more first devices. The addressing field is associated with the one or more group IDs. The operations may further include configuring the at least one of the one or more first devices to at least one of the one or more group IDs. The operations may further include sending one or more setup frames associated with the one or more first devices.

According to example embodiments of the disclosure, there may include a method. The method may include determining one or more short sector sweep frames associated with one or more antennas of a device. The method may include setting one or more fields of at least one of the one or more short sector sweep frames to indicate a multiple-input and multiple-output (MIMO) communication with one or more first devices. The method may include sending the one or more short sector sweep frames to the one or more first devices. The method may include identifying one or more response frames from at least one of the one or more first devices based at least in part on the one or more short sector sweep frames.

The implementations may include one or more of the following features. The method may further include determining one or more information elements associated with the one or more short sector sweep frames. The one or more information elements include at least in part one or more group IDs associated with the at least one of the one or more first devices. The one or more short sector sweep frames include at least in part an addressing mode field, a duration field, and an addressing field. The addressing mode field indicates that the MIMO communication is a multiuser (MU) communication or a single user (SU) communication with at least one of the one or more first devices. The addressing field is associated with the one or more group IDs. The method may further include configuring the at least one of the one or more first devices to at least one of the one or more group IDs. The method may further include sending one or more setup frames associated with the one or more first devices.

According to example embodiments of the disclosure, there may include a method. The method may include identifying one or more short sector sweep frames associated with one or more antenna sectors of a device. The method may include identifying at least one of an addressing mode field, a duration field, and an addressing field within at least one of the one or more short sector sweep frames. The method may include determining a type of communication with the device based at least in part on the addressing mode field and the addressing field.

The implementations may include one or more of the following features. The method may further include identifying one or more information elements (IEs) received in at least one of a beacon frame, an announce frame, or a trigger frame, wherein the one or more IEs include at least in part one or more group IDs associated with one or more first devices. The type of communication is at least one of a single user or a multiuser multiple-input multiple-output (MIMO) communication. The addressing field is associated with the one or more group IDs. The one or more short sector sweep frames include at least in part an addressing mode field, a duration field, and an addressing field. The method may further include determining a device identification (ID) associated with one of the one or more first devices. The method may include determining the device ID is associated with the one or more group IDs. The method may include identifying an MIMO setup message received from the device. The method may include causing to send an MIMO response message to the device. The method may further include determining a device identification (ID) associated with one of the one or more first devices. The method may include determining the device ID is not associated with the one or more group IDs. The method may include causing to enter an inactive mode for a time duration included in the duration field of at least one of the one or more short sector sweep frames.

In example embodiments of the disclosure, there may be an apparatus. The apparatus may include means for determining one or more short sector sweep frames associated with one or more antennas of a device. The apparatus may include means for setting one or more fields of at least one of the one or more short sector sweep frames to indicate a multiple-input and multiple-output (MIMO) communication with one or more first devices. The apparatus may include means for sending the one or more short sector sweep frames to the one or more first devices. The apparatus may include means for identifying one or more response frames from at least one of the one or more first devices based at least in part on the one or more short sector sweep frames.

The implementations may include one or more of the following features. The apparatus may further include means for determining one or more information elements associated with the one or more short sector sweep frames. The one or more information elements include at least in part one or more group IDs associated with the at least one of the one or more first devices. The one or more short sector sweep frames include at least in part an addressing mode field, a duration field, and an addressing field. The addressing mode field indicates that the MIMO communication is a multiuser (MU) communication or a single user (SU) communication with at least one of the one or more first devices. The addressing field is associated with the one or more group IDs. The apparatus may further include means for configuring the at least one of the one or more first devices to at least one of the one or more group IDs. The apparatus may further include means for sending one or more setup frames associated with the one or more first devices.

In example embodiments of the disclosure, there may be an apparatus. The apparatus may include means for identifying one or more short sector sweep frames associated with one or more antenna sectors of a device. The apparatus may include means for identifying at least one of an addressing mode field, a duration field, and an addressing field within at least one of the one or more short sector sweep frames. The apparatus may include means for determining a type of communication with the device based at least in part on the addressing mode field and the addressing field.

The implementations may include one or more of the following features. The apparatus may further include identifying one or more information elements (IEs) received in at least one of a beacon frame, an announce frame, or a trigger frame, wherein the one or more IEs include at least in part one or more group IDs associated with one or more first devices. The type of communication is at least one of a single user or a multiuser multiple-input multiple-output (MIMO) communication. The addressing field is associated with the one or more group IDs. The one or more short sector sweep frames include at least in part an addressing mode field, a duration field, and an addressing field. The apparatus may further include means for determining a device identification (ID) associated with one of the one or more first devices. The apparatus may further include means for determining the device ID is associated with the one or more group IDs. The apparatus may include means for identifying an MIMO setup message received from the device. The apparatus may include means for causing to send an MIMO response message to the device. The apparatus may further include means for determining a device identification (ID) associated with one of the one or more first devices. The apparatus may include means for determining the device ID is not associated with the one or more group IDs. The apparatus may include means for causing to enter an inactive mode for a time duration included in the duration field of at least one of the one or more short sector sweep frames.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising memory and processing circuitry configured to:
    determine one or more short sector sweep frames associated with one or more antennas of the device, wherein the one or more short sector sweep frames include at least in part an addressing mode field, a duration field, and an addressing field;
    cause to set one or more fields of at least one of the one or more short sector sweep frames to indicate a multiple-input and multiple-output (MIMO) communication with one or more first devices;
    determine one or more information elements associated with the one or more short sector sweep frames, wherein the one or more information elements include at least in part one or more group IDs associated with one or more first devices;
    cause to send the one or more short sector sweep frames to the one or more first devices; and
    identify one or more response frames from at least one of the one or more first devices based at least in part on the one or more short sector sweep frames.

2. The device of claim 1, wherein the addressing mode field indicates that the MIMO communication is a multiuser (MU) communication or a single user (SU) communication with at least one of the one or more first devices.

3. The device of claim 1, wherein the addressing field is associated with the one or more group IDs.

4. The device of claim 1, wherein the memory and the processing circuitry are further configured to assign the at least one of the one or more first devices to at least one of the one or more group IDs.

5. The device of claim 1, wherein the memory and the processing circuitry are further configured to cause to send one or more setup frames associated with the one or more first devices.

6. The device of claim 1, further comprising a transceiver configured to transmit and receive wireless signals.

7. The device of claim 6, further comprising one or more antennas coupled to the transceiver.

8. A non-transitory computer-readable medium storing computer-executable instructions which when executed by one or more processors result in performing operations comprising:
    identifying one or more short sector sweep frames associated with one or more antenna sectors of a device, wherein the one or more short sector sweep frames include at least in part an addressing mode field, a duration field, and an addressing field;
    identifying one or more information elements (IEs) received in at least one of a beacon frame, an announce frame, or a trigger frame, wherein the one or more IEs include at least in part one or more group IDs associated with one or more first devices;
    identifying at least one of an addressing mode field, a duration field, and an addressing field within at least one of the one or more short sector sweep frames; and
    determining a type of communication with the device based at least in part on the addressing mode field and the addressing field.

9. The non-transitory computer-readable medium of claim 8, wherein the type of communication is at least one of a single user or a multiuser multiple-input multiple-output (MIMO) communication.

10. The non-transitory computer-readable medium of claim 8, wherein the addressing field is associated with the one or more group IDs.

11. The non-transitory computer-readable medium of claim 8, wherein the operations further comprise:
    determining a device identification (ID) associated with one of the one or more first devices;
    determining the device ID is associated with the one or more group IDs;
    identifying an MIMO setup message received from the device; and
    causing to send an MIMO response message to the device.

12. The non-transitory computer-readable medium of claim 8, wherein the operations further comprise:
    determining a device identification (ID) associated with one of the one or more first devices;
    determining the device ID is not associated with the one or more group IDs; and
    causing to enter an inactive mode for a time duration included in the duration field of at least one of the one or more short sector sweep frames.

13. A method comprising:
    determining one or more short sector sweep frames associated with one or more antennas of a device, wherein the one or more short sector sweep frames include at least in part an addressing mode field, a duration field, and an addressing field;
    setting one or more fields of at least one of the one or more short sector sweep frames to indicate a multiple-input and multiple-output (MIMO) communication with one or more first devices;
    identifying one or more information elements associated with the one or more short sector sweep frames, wherein the one or more information elements include at least in part one or more group IDs associated with one or more first devices;
    sending the one or more short sector sweep frames to the one or more first devices; and
    identifying one or more response frames from at least one of the one or more first devices based at least in part on the one or more short sector sweep frames.

14. The method of claim 13, further includes determining one or more information elements associated with the one or more short sector sweep frames.

15. The method of claim 14, wherein the one or more information elements include at least in part one or more group IDs associated with the at least one of the one or more first devices.

* * * * *